US008449424B2

(12) United States Patent  (10) Patent No.: US 8,449,424 B2
Schoon  (45) Date of Patent: May 28, 2013

(54) INTEGRAL ELECTRIC MOTOR WITH SPEED SENSOR, PLANETARY GEARBOX AND STEERING MEANS

(75) Inventor: Benjamin Warren Schoon, Lafayette, IN (US)

(73) Assignee: Fairfield Manufacturing Company Inc., Lafayette, IN (US)

( * ) Notice: Subject to any disclaimer, the term of this patent is extended or adjusted under 35 U.S.C. 154(b) by 37 days.

(21) Appl. No.: 13/050,895

(22) Filed: Mar. 17, 2011

(65) Prior Publication Data

US 2012/0238389 A1  Sep. 20, 2012

(51) Int. Cl.
*F16H 48/06* (2006.01)
(52) U.S. Cl.
USPC .......................................................... 475/153
(58) Field of Classification Search
USPC .............................. 475/153, 208, 257; 477/91
See application file for complete search history.

(56) References Cited

U.S. PATENT DOCUMENTS

| 2,726,726 | A | 12/1955 | Le Tourneau |
| 3,161,249 | A | 12/1964 | Bouladon et al. |
| 3,163,250 | A | 12/1964 | Gibson |
| 3,370,668 | A | 2/1968 | Goodacre |
| 3,704,759 | A | 12/1972 | Vitkov et al. |
| 3,812,928 | A | 5/1974 | Rockwell et al. |
| 3,865,203 | A | 2/1975 | Hibma |
| 3,892,300 | A | 7/1975 | Hapeman et al. |
| 4,088,202 | A | 5/1978 | Costello |
| 4,116,293 | A | 9/1978 | Fukui |
| 4,330,045 | A | 5/1982 | Myers |
| 4,365,525 | A | * 12/1982 | Imazaike ...................... 475/337 |
| 4,380,274 | A | 4/1983 | Abraham et al. |

(Continued)

FOREIGN PATENT DOCUMENTS

| JP | 4-185531 | 7/1992 |
| TW | 577836 | 3/2004 |
| TW | I330600 | 9/2010 |
| TW | I331662 | 10/2010 |

OTHER PUBLICATIONS

Technical Report, Application No. 100208949 e01, Utility Patent No. M423400, Patent name: Integral Electric Motor With Speed Sensor, Planetary Gearbox and Steering Means, Application date: May 19, 2011, Priority date: Mar. 17, 2011, Patent owner: Fairfield Manufacturing Company, Application date of technical report: Mar. 30, 2012, Applicant of technical report: Fairfield Manufacturing Company, Issue date: Dec. 21, 2012.

(Continued)

*Primary Examiner* — Justin Holmes
*Assistant Examiner* — Stacey Fluhart
(74) *Attorney, Agent, or Firm* — Woodling, Krost and Rust

(57) ABSTRACT

A steerable wheel motor assembly for moving construction lifts and scaffold equipment is disclosed and claimed which includes a spindle bracket configured to be pivotably mounted at an upper end to a steering mechanism for rotation about a vertical axis. The output shaft is supported by a first set of bearings and a second set of bearings with the second set of bearings including a speed and direction sensor integral therewith for detecting the speed and direction of rotation of the output shaft. The sensor outputs to a control system which controls the speed and direction of the equipment. A thrust washer is used to position the output sun gear accurately reducing manufacturing and maintenance costs of the assembly. Use of the thrust washer reduces the cost of machining the output shaft to a high tolerance.

6 Claims, 8 Drawing Sheets

U.S. PATENT DOCUMENTS

| | | |
|---|---|---|
| 4,930,590 A | 6/1990 | Love et al. |
| 5,087,229 A | 2/1992 | Hewko et al. |
| 5,322,141 A | 6/1994 | Brunner et al. |
| 5,685,798 A | 11/1997 | Lutz et al. |
| 5,813,488 A | 9/1998 | Weiss |
| 6,367,571 B1 | 4/2002 | Schwarz |
| 6,386,553 B2 | 5/2002 | Zetterstrom |
| 6,457,681 B1 * | 10/2002 | Wolf et al. ................ 246/187 A |
| 6,776,420 B2 * | 8/2004 | Vignotto et al. .............. 277/572 |
| 6,852,061 B2 | 2/2005 | Schoon |
| 8,133,143 B2 * | 3/2012 | Schoon ......................... 475/156 |

OTHER PUBLICATIONS

SKF Mechatronics Catalog, pp. 955-965, Sensor-Bearing Units, at least as early as Feb. 15, 2011.

\* cited by examiner

INTEGRAL ELECTRIC MOTOR WITH SPEED SENSOR, PLANETARY GEARBOX AND STEERING MEANS

FIELD OF THE INVENTION

The invention relates generally to electrical wheel motor drive systems for small compact construction equipment.

BACKGROUND OF THE INVENTION

U.S. Pat. No. 6,852,061, issued Feb. 8, 2005, is incorporated herein by reference and is substantially copied herein and quoted below, in this, the BACKGROUND OF THE INVENTION, section of the instant patent application. FIGS. 1-3 are substantial duplicates from U.S. Pat. No. 6,852,061. FIG. 1 is a perspective view 100 of a pair of wheel motors in accordance with the prior art interconnected by a tie bar used for steering. FIG. 2 is a front view 200 of a wheel motor in accordance with the prior art. FIG. 3 is a side, partially cross-sectional view 300 taken along line 3-3 of FIG. 2 in accordance with the prior art. FIG. 3A is a side, partially cross-sectional view 300A, of another embodiment of the prior art.

U.S. Pat. No. 6,852,061, issued Feb. 8, 2005, states as follows:

"With respect to FIG. 1, two wheel motor assemblies 10 are shown in a paired relationship with an interconnecting tie bar assembly 12 which is pivotably connected at each end to spindle brackets 14. Spindle brackets 14 are pivotably mounted on a shaft (not shown) extending downwardly from brackets 16. Brackets 16 can be mounted to the appropriate undercarriage of the scissor lift or other scaffold equipment (not shown). Tie bar assembly 12 is connected to the steering mechanism of the equipment (not shown) so that the tie bar can be moved laterally to cause the wheel motor assemblies to pivot around the shaft to steer the equipment.

With reference to FIGS. 2 and 3, wheel motor assembly 10 comprises spindle bracket 14 to which is mounted motor 18. The upper end 15 of spindle bracket 14 has a hollow cylindrical opening 20 formed throughout which is dimensional (sic, dimensioned) to receive the cylindrical shaft (not shown) mounted on bracket 16 so that the spindle bracket 14 can pivot about vertical axis 22.

Electrical power is supplied to motor 18 through electrical cable 24 which is connected to an appropriate power source. The application of electrical power through cable 24 causes output shaft 26 or motor 18 to rotate. Output shaft 26 is supported for rotation by shaft bearing 28 positioned within a circular opening 29 through the lower end 57 of spindle bracket 14. An O-ring seal 30 is provided around the edge of motor 18 to prevent dust and debris from entering the motor compartment and to support the motor 18. Additionally, a shaft lip seal 32 is provided to further seal the shaft 26 to prevent lubricant from exiting and dust and debris from entering the gear compartment 31. Gear compartment 31 comprises a hollow interior portion of the lower end 57 of spindle bracket 14. Shaft bearing 28 is retained in position by a retaining ring 34. Mounted on the end of output shaft 26 is input sun gear 36 which is retained on the end of shaft 26 by a retaining ring 38 which engages a recess on the end of shaft 26. Sun gear 36 comprises a plurality of gear teeth which engage corresponding gear teeth on input planet gears 40 (only one of three shown). A ring gear 42 having a plurality of gear teeth is positioned to engage the teeth of input planet gears 40 so that rotation of the input sun gear 36 causes the input planet gears 40 to rotate within ring gear 42 to cause the input planet gears to circle around sun gear 36. Planet gears 40 are mounted for rotation on input planet pins 44 by lock ring 41, and are supported for rotation about input planet pins 44 by needle bearings 43. Pins 44 are mounted to an input carrier 46 which is joined to output sun gear 48. Input carrier 46 is locked to output sun gear 48 by a locking ring 49. Sun gear 48 is mounted for rotation around shaft 26. Thus, when input planetary gears 40 are caused to circle about sun gear 36 as sun gear 36 rotates, carrier 46 and joined output sun gear 48 are caused to rotate about shaft 26 in the same direction.

Output sun gear 48 has teeth which engage gear teeth on output planet gears 50 which are mounted for rotation to the spindle bracket 14 by output planet pins 52. Thrust washers 54 are provided on each side of output planet gears 50 around pin 52 and needle bearings 56 support the output planet gears 50 for easy rotation.

Mounted for rotation about lower end 57 of spindle bracket 14 is generally cylindrically shaped hub 58. Hub 58 is supported for rotation by bearings 60 and 62. Bearings 60 are retained in position by retaining ring 61. Joined to the interior surface 59 of hub 50 is an output ring gear 64 which engages output planet gears 50. Rotation of the output planet gears 50 caused by the rotation of the output sun gear 48 causes the output ring gear 64 to rotate causing joined hub 58 to rotate. Thus, the application of electrical power to motor 18 causes output shaft 26 and attached input sun gear 36 to rotate which in turn causes input planet gears to rotate around the interior of ring gear 42 which in turn rotates input carrier 46 and attached output sun gear 48 about shaft 26. The rotation of output sun gear 48 in turn causes output planet gears 50 to rotate which in turn causes output ring gear 64 and integrally joined hub 58 to rotate. A rubber wheel (not shown) is normally attached to the exterior surface 55 of hub 58 by bolts (not shown) screwed into threaded recesses 66 formed on a vertical face 68 of hub 58.

A cover 70 overlies the open exterior end of hub 58 and is retained in position by a locking ring 72 which engages a groove at the open exterior end of hub 58. An O-ring seal 74 is positioned around the edge of cover 70 to prevent lubricant from exiting and dust and construction debris from entering the planetary gear compartment 31. Also, a lip seal 76 is provided around the interior edge of hub 58 and the edge of spindle bracket 14 to prevent lubricant from exiting and dust and construction debris from entering the interior of the mechanism from the back side.

Electric motor 18 has a braking mechanism 79 contained at the exterior end of motor 18 and is covered by cover 78. The braking mechanism operates to lock shaft 26 to prevent rotation of shaft 26 when electrical power is removed from motor 18 but to release shaft 26 for rotation whenever electrical power is applied to motor 18. This locking mechanism prevents movement of the wheels any time electrical power is not being applied. Thus, if wheel motor assembly 10 is used to drive a scissor lift or other scaffolding type equipment, such equipment is locked and prevented from movement once the electrical power is removed from motor 24."

SUMMARY OF THE INVENTION

An assembly for moving construction lifts and scaffold equipment is disclosed and claimed. The assembly includes first and second steerable wheel motor assemblies for moving construction lifts and scaffold equipment. Each of the first and second steerable wheel motor assemblies for moving construction lifts and scaffold equipment includes a spindle bracket configured to be pivotably mounted at an upper end to a steering mechanism for rotation about a vertical axis. Each of the assemblies further includes an electric motor mounted to a lower end of the spindle bracket. The motor has an output shaft that rotates about an axis when electrical power is supplied to the motor. The output shaft is positioned through a shaft opening into an interior portion of the lower end of the spindle bracket.

The output shaft is supported by a first set of bearings and a second set of bearings. The first set of bearings resides within the electric motor and the second set of bearings resides between the spindle bracket and the output shaft. The second set of bearings includes a speed and direction sensor integral therewith for detecting the speed and direction of rotation of the output shaft.

The second set of bearings includes an inner race and an outer race. The inner race is affixed to the output shaft and rotatable therewith and the outer race is stationary. A magnetized impulse ring is affixed to the inner race and is rotatable therewith. A sensor body is affixed to the outer race of the second set of bearings which detects the magnetic impulses provided when the inner impulse ring and the shaft are rotating. A substantially cylindrical wheel hub is mounted to the spindle bracket for rotation about a horizontal axis coincident with the axis of rotation of the output shaft.

The wheel hub includes an exterior surface to which a wheel can be mounted, an interior surface surrounding the interior portion of the lower end of the spindle bracket, an interior edge between the exterior and interior surfaces, and, an exterior edge between the exterior and interior surfaces. The hub is supported for rotation by a third set of bearings positioned adjacent the interior edge of the hub, and a fourth set of bearings positioned inwardly from the exterior edge of the hub.

A multi-stage planetary gear system is mounted around the output shaft of the motor and positioned within the interior portion of the spindle bracket and within the cylindrical wheel hub between the exterior edge and the interior edge. The planetary gear system includes an input sun gear positioned between the fourth set of bearings and the exterior edge of the hub and mounted on the output shaft of the motor.

The input sun gear includes a proximate portion and a distal portion. The planetary gear system further includes input planetary gears, a first ring gear affixed to the interior portion of the wheel hub, an input gear carrier including a splined interior, and, an output sun gear including a splined exterior. The output sun gear includes a proximate portion and a distal portion. A thrust washer resides between the spindle bracket and the proximate end of the output sun gear. The proximate portion of the output sun gear interengages the thrust washer and the distal portion of the output sun gear interengages the proximate portion of the input sun gear.

An end cover is affixed to the wheel hub and is rotatable therewith. The end cover of the wheel hub includes a centrally located cylindrical recess therein. A circumferential spacer ring and a circumferential bracket reside in the cylindrical recess in the cover. The distal portion of the input sun gear interengages the circumferential bracket in the cylindrical recess in the cover.

The input sun gear rotationally drives the input planetary gears which are in engagement with and react against the first ring gear producing rotation of the input gear carrier. The splined interior of the input gear carrier interengages the splined exterior of the output sun gear. The planetary gear system further includes output planetary gears driven by the splined exterior of the output sun gear. The output planetary gears are mounted for rotation with respect to the spindle. An output ring gear is positioned between the third set of bearings and the fourth set of bearings and joined to the interior surface of the wheel hub. The output ring gear engages the output planetary gears of the multistage planetary gear system so that rotation of the output planetary gears causes the output planetary gears and the wheel hub to rotate such that mechanical force through the planetary gear system is applied to the wheel hub.

The speed and direction sensor which is integral with the second set of bearing unit outputs two square wave signals. A signal processor adapts the square wave signals for input into the microprocessor. The microprocessor receives the adapted square wave signals. An operator input station applies the desired wheel hub speed and direction to the microprocessor. The microprocessor receives the adapted square wave signals and compares the square wave signals to the desired wheel hub speed and direction input signals and outputs a corrective control signal according to an algorithm. Any number of algorithms may be used and the algorithms may be used to protect the motor. The microprocessor, sometimes referred to herein as an embedded microcontroller or embedded microprocessor, protects the motors.

A motor controller receives and processes the corrective control signal from the microprocessor and outputs a control signal to the electric motor dictating the speed and direction of the output shaft.

One of the main benefits of a speed sensor in mobile applications is that it allows for closed-loop motor control. This allows for fine tuning the voltage delivered to the motor armature based on the speed measured by the sensor, so that the motor speed will exactly match the target (command) speed. The speed sensor also provides means of protection to the motor. The controller can detect if there is a locked rotor condition and will stop delivering power to the motor. Without the speed sensor the controller could continue to deliver power to the motor until the motor burned up. Speed sensors can be used in a variety of different control scenarios some of which would be application dependent. Speed sensors may be used for traction control or to ensure that braking or acceleration is done at specific rate or within a specific distance. Speed sensors may also be used as an odometer and/or speedometer.

A thrust washer between the spindle and the output sun gear allows control of the output sun gear and input carrier end play more precisely. Use of the thrust washer controls the end play of the output sun gear without requiring precise machining of the shaft within the motor and thus reduces cost and complexity in the electric motor. Use of the thrust washer enables proper fitting of the output sun gear within the required space. Without the use of the thrust washer, due to manufacturing tolerance buildup, the output sun gear may either be too loose or it may be too tight.

The interengagement of the proximate portion of the output sun gear with the thrust washer, the interengagement of the distal portion of the output sun gear with the proximate portion of the first sun gear, and the interengagement of the distal portion of the input sun gear with the circumferential bracket in the cylindrical recess in the cover controls the position of the output sun gear axially.

Use of the thrust washer eliminates the need to control the distance between a first shoulder 301 and a second shoulder of the output shaft. Shoulder on output shaft must reside at the precise location distally with respect to the motor or another location on the output shaft. Put another way, shoulder on shaft must be located precisely with respect to spindle. The location of shoulder is important as a corresponding shoulder engages shoulder of output shaft and rotates with respect to output shaft. The precise location of shoulder on shaft determines whether the generally cylindrically shaped output sun gear fits correctly in the allotted space. If the shoulder is located at the proper axial location the output sun gear will fit properly. If the axial location of shoulder is located too far from shoulder, then the output sun gear will fit too tightly between shoulder and the proximate end of input sun gear. If the axial location of shoulder is not located far enough from shoulder, then output sun gear will fit too loosely between shoulder and the proximate end of input sun gear. Reference numeral indicates a seal residing between the output shaft and spindle adjacent washer.

A steerable wheel motor assembly for moving construction lifts and scaffold equipment is disclosed and claimed which includes a spindle bracket configured to be pivotably mounted at an upper end to a steering mechanism for rotation about a vertical axis. The output shaft is supported by a first set of bearings and a second set of bearings with the second set of bearings including a speed and direction sensor integral therewith for detecting the speed and direction of rotation of the output shaft. The sensor outputs to a control system which controls the speed and direction of the equipment. A thrust washer is used to position the output sun gear accurately reducing manufacturing and maintenance costs of the assembly. Use of the thrust washer reduces the cost of machining the output shaft to a high tolerance.

It is an object of the present invention to provide an output shaft being supported by a first set of bearings and a second set of bearings wherein the second set of bearings resides between the spindle bracket and the output shaft and wherein the second set of bearings includes a speed and direction sensor integral therewith for detecting the speed and direction of rotation of the output shaft.

It is a further object of the present invention to provide a second set of bearings which includes an inner race and an outer race with the inner race being affixed to the output shaft and rotatable therewith and the outer race being stationary.

It is a further object of the present invention to provide a second set of bearings wherein a magnetized impulse ring is affixed to the inner race and is rotatable therewith and wherein a sensor body is affixed to the outer race of the second set of bearings which detects the magnetic impulses provided when the inner impulse ring and the shaft are rotating.

It is a further object of the present invention wherein a speed and direction sensor outputs two square wave signals, a signal processor adapts the square wave signals for input into a microprocessor, the microprocessor receives the adapted square wave signals, and then compares the adapted process signals with respect to the desired wheel hub speed and direction.

It is a further object of the present invention wherein the microprocessor receives the adapted square wave signals and compares the square wave signals to the desired wheel hub speed and direction input signals and outputs a corrective control signal according to an algorithm.

It is a further object of the present invention wherein any number of algorithms may be used and the algorithms may be used to protect the motor.

It is a further object of the present invention wherein a motor controller receives and processes the corrective control signal from the microprocessor and outputs a control signal to the electric motor dictating the speed and direction of the output shaft.

It is a further object of the present invention wherein the speed sensor is used for closed-loop motor control which allows fine tuning the voltage delivered to the motor armature based on the speed measured by the sensor so that the motor speed will nearly exactly match the target (command) speed.

It is a further object of the present invention to provide a speed sensor in combination with a microprocessor as a means of protection to the motor.

It is a further object of the present invention to provide a speed sensor in combination with a microprocessor as a means of limiting acceleration and deceleration.

It is a further object of the present invention to provide a speed sensor in combination with a microprocessor to be used as a speedometer or odometer.

It is a further object of the present invention to provide a thrust washer between the spindle and the output sun gear which allows control of the output sun gear and input carrier end play more precisely.

It is a further object of the present invention to provide a thrust washer so as to lessen the need for precise machining of the shaft within the motor and without the motor thus reducing cost and complexity in the electric motor.

It is a further object of the present invention to: interengage the proximate portion of the output sun gear with the thrust washer, to interengage the distal portion of the output sun gear with the proximate portion of the first sun gear, and to interengage the distal portion of the input sun gear with the circumferential bracket in the cylindrical recess in the cover, thus controlling the axial position of the output sun gear.

DESCRIPTION OF THE INVENTION

Figure 4:
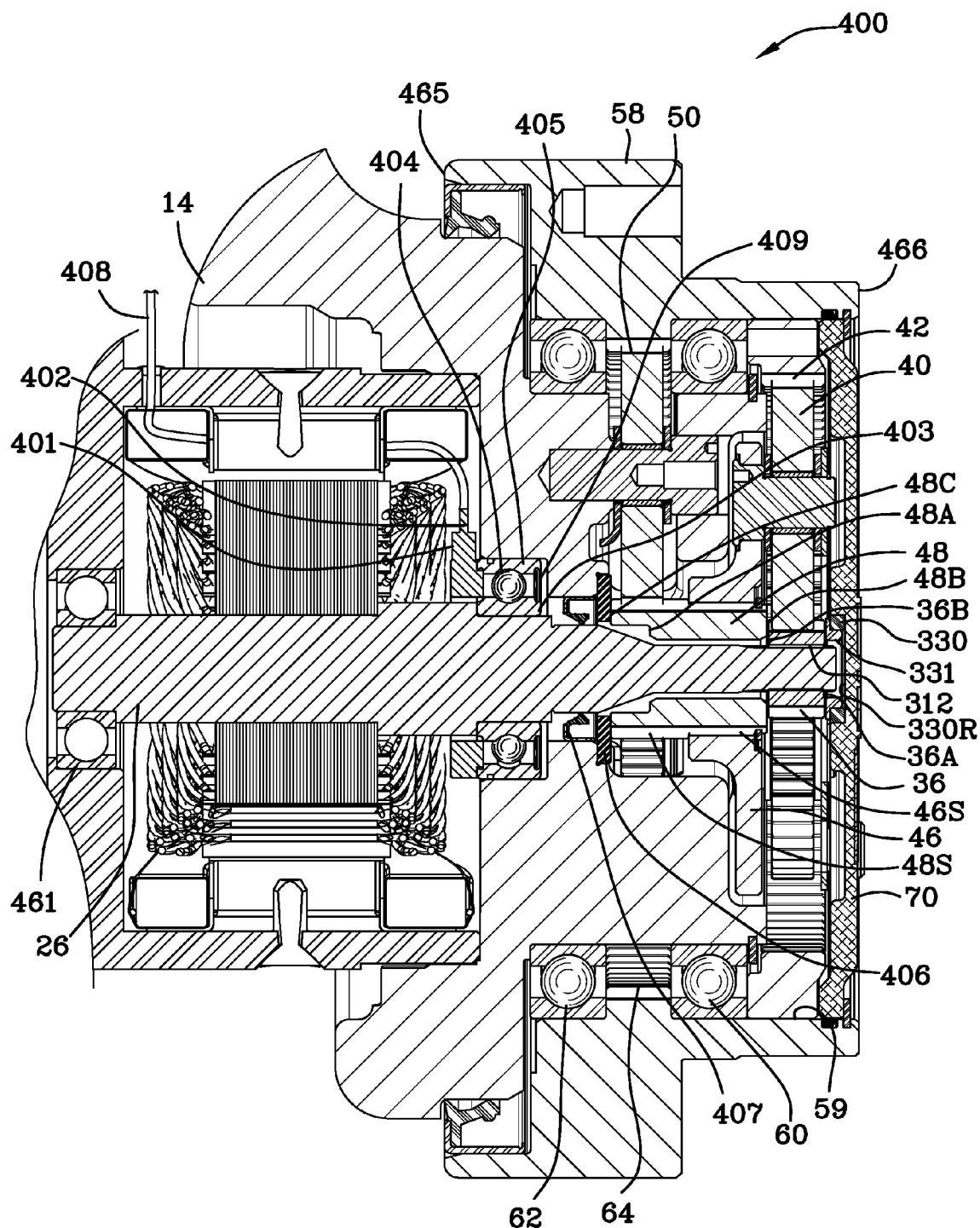
FIG. 4 is a cross-sectional view of the invention illustrating the speed sensor bearing unit, the thrust washer, the output sun gear abutting the thrust washer and the output shaft.
Figure 4A:
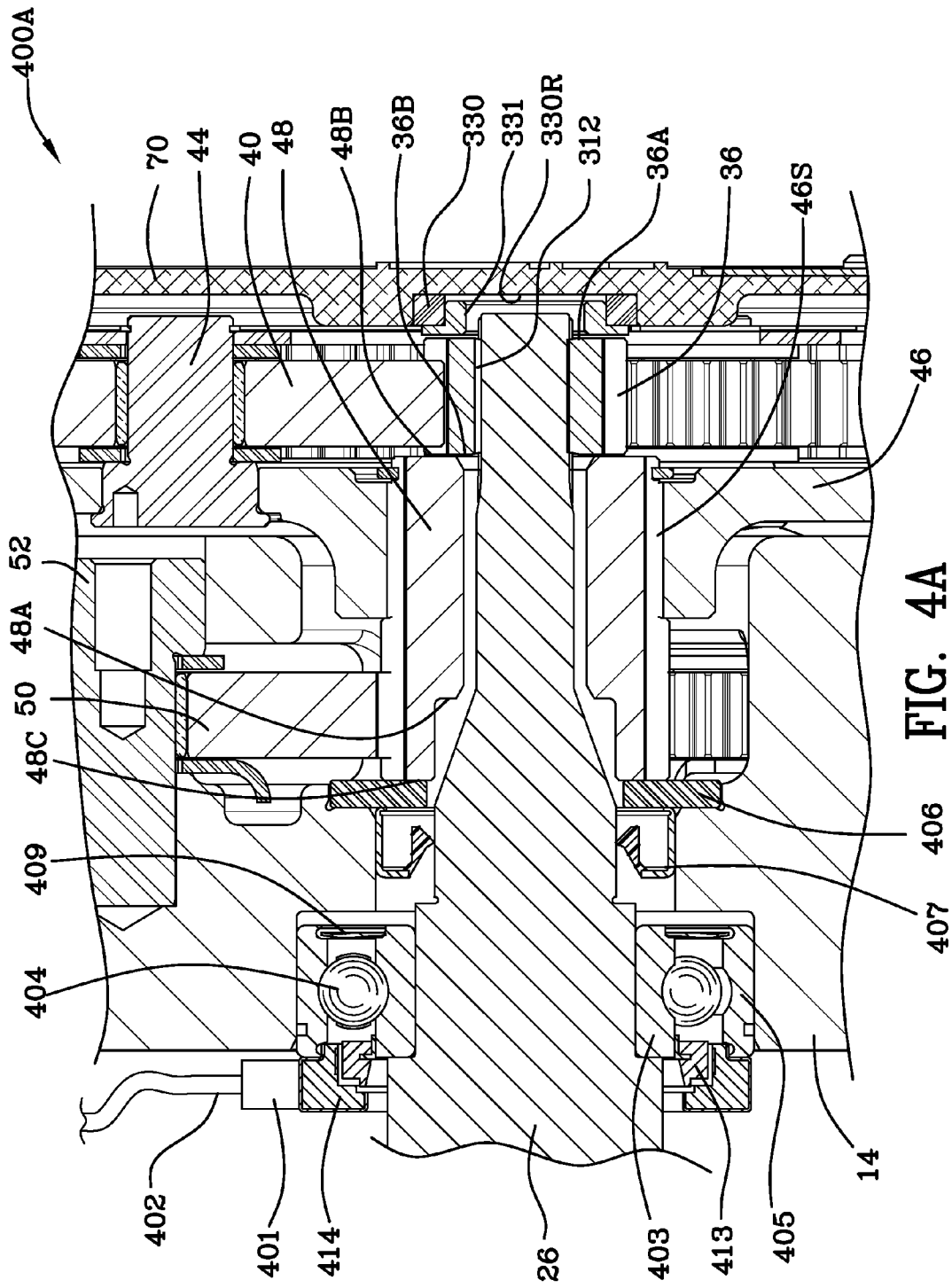
FIG. 4A is an enlargement of a portion of FIG. 4.

FIG. 4 is a cross-sectional view 400 of the invention illustrating the speed sensor bearing unit 401, the thrust washer 406, the output sun gear 48 abutting the thrust washer 406 and the output shaft 26. An assembly 10 includes first and second steerable wheel motor assemblies for moving construction lifts and scaffold equipment. Each of the first and second steerable wheel motor assemblies for moving construction lifts and scaffold equipment includes a spindle bracket 14 configured to be pivotably mounted at an upper end 15 to a steering mechanism for rotation about a vertical axis 22. Each of the assemblies further includes an electric motor 18 mounted to a lower end of the spindle bracket. The motor has an output shaft 26 that rotates about an axis when electrical power is supplied to the motor. The output shaft is positioned through a shaft opening into an interior portion of the lower end of the spindle bracket 14.

The output shaft is supported by a first set of bearings 461 and a second set of bearings 401. The first set of bearings 461 resides within the electric motor between the motor housing and the shaft 26.

Figure 4B:
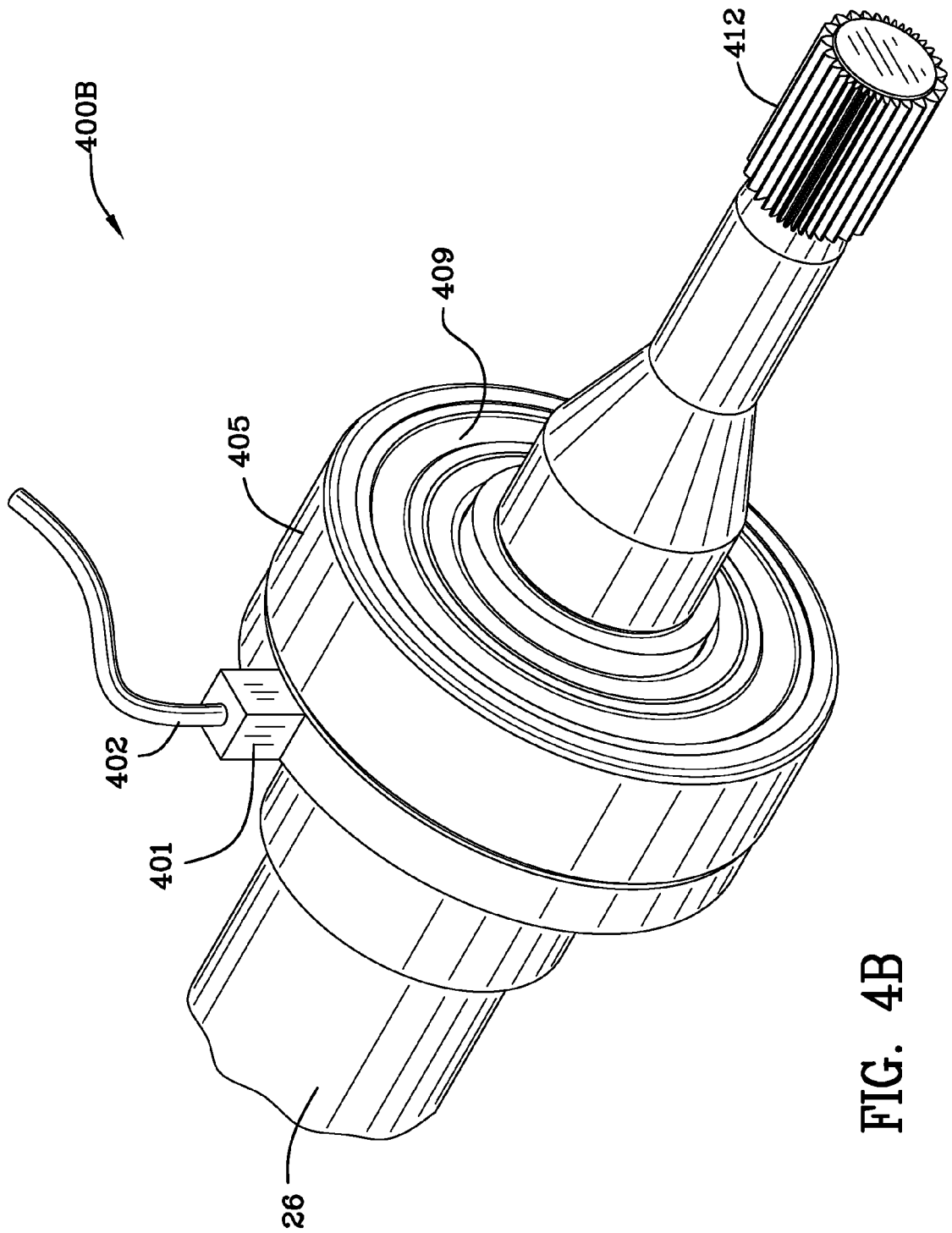
FIG. 4B is a perspective view of the speed sensor bearing unit mounted on the output shaft.

FIG. 4B is a perspective view 400B of the speed sensor bearing unit 401 mounted on the output shaft 26. The second set of bearings 401 resides between spindle bracket 14 and output shaft 26. The second set of bearings 401 includes a speed and direction sensor integral therewith for detecting the speed and direction of rotation of the output shaft 26.

The second set of bearings 401 includes an inner race 403 and an outer race 405 and a plurality of ball bearings 404. Inner race 403 is affixed to the output shaft 26 and rotatable therewith and outer race 405 is stationary. A magnetized impulse ring 413 is affixed to the inner race 403 and is rotatable therewith as shaft 26 rotates. A sensor body 414 is affixed to the outer race 405 of the second set of bearings 401 which detects the magnetic impulses provided when the inner impulse ring 413 and the shaft 26 are rotating. A cable 402, 408 leads from the sensor 401 to communicate with a control system illustrate in FIG. 4C. Reference numeral 408 indicates the external portion of the cable which extends from the motor housing as illustrated in FIG. 4.

The sensor-bearing units 401 are specially designed incremental encoders for motor control and they are produced by SKF Mechatronics. The SKF Mechatronics sensor is being set forth herein by way of example only and many different sensors and different types of sensors may be used. The sensor-bearing units 401 provide compact and reliable encoding which is subsequently processed and then used in a control system. The sensor-bearing units employed herein are intended for applications with a rotating inner ring and stationary outer ring.

The sensor bearing unit 401 incorporates an active sensor designed to be compact and resides very close to an incremental encoder. The sensor's main components are the impulse ring, the sensor body with the sensors and the connecting cable. The composite magnetized impulse ring is attached to the stationary bearing inner race which is divided into a certain number of north and south poles. The sensor body is attached to the bearing outer race. The sensor body has two sensing cells for measuring and counting the rotation of the shaft in two different rotational directions. The sensor requires an external voltage supply. The sensor outputs two different square waves and depending on which signal is leading, the direction of rotation is determined and the speed of rotation of is determined.

A substantially cylindrical wheel hub 58 is mounted to the spindle bracket 14 for rotation about a horizontal axis coincident with the axis of rotation of the output shaft 26. The wheel hub includes an exterior surface 55 to which a wheel can be mounted, an interior surface 59 surrounding the interior portion of the lower end of the spindle bracket 14, an interior edge 465 between the exterior 58 and interior 59 surfaces, and, an exterior edge 466 between the exterior 58 and interior 59 surfaces. The hub 58 is supported for rotation by a third set of bearings 62 positioned adjacent the interior edge 466 of the hub, and a fourth set of bearings 60 positioned inwardly from the exterior edge 465 of the hub.

A multi-stage planetary gear system is mounted around the output shaft 26 of the motor and positioned within the interior portion of the spindle bracket 14 and within the cylindrical wheel hub 58 between the exterior edge 466 and the interior edge 465. The planetary gear system includes an input sun gear 36 positioned between the fourth set of bearings 60 and the exterior edge 466 of the hub 58 and mounted on the output shaft 26 of the motor. Input sun gear 36 includes an exterior spline which engages exterior spline 412 of output shaft 26.

Input sun gear 36 includes a proximate portion 36B and a distal portion 36A. Input sun gear 36 is sometimes referred to herein as a "first" sun gear. Proximate refers to the side (or point) closest the motor and distal refers to the side (or point) farthest from the motor. The planetary gear system further includes input planetary gears 40, a first ring gear 61 affixed to the interior portion of the wheel hub 58, an input gear carrier 46 including a splined interior 46A, and, an output sun gear 48 including a splined exterior 48S. Sometimes herein, the input planetary gears 40 are referred to as the first planetary gears. Also, sometimes herein the input gear carrier 46 is referred to as the first carrier.

The output sun gear 48 includes a proximate portion 48C and a distal portion 48B. The output sun gear is mounted for rotation about the output shaft. A thrust washer 406 resides between the spindle bracket 14 and the proximate end 48C of the output sun gear 48. The proximate portion 48C of the output sun gear 48 interengages the thrust washer 406 and the distal portion 48B of the output sun gear 48 interengages the proximate portion 36B of the input sun gear 36.

An end cover 70 is affixed to the wheel hub 58 and is rotatable therewith. The end cover of the wheel hub includes an interior, the interior includes a centrally located cylindrical recess 330R therein. A circumferential spacer ring 330 and a circumferential bracket 331 reside in the cylindrical recess 330R in the cover. The distal portion 36A of the input sun gear 36 interengages the circumferential bracket 331 in the cylindrical recess 330R in the cover.

The interengagement of the proximate portion 48C of the output sun gear with the thrust washer 406, the interengagement of the distal portion 48B of the output sun gear 48 with the proximate portion 36B of the first sun gear 36, and the interengagement of the distal portion 36A of the input sun gear with the circumferential bracket 331 in the cylindrical recess 330R in the cover controls the position of the output sun gear axially.

Figure 3:
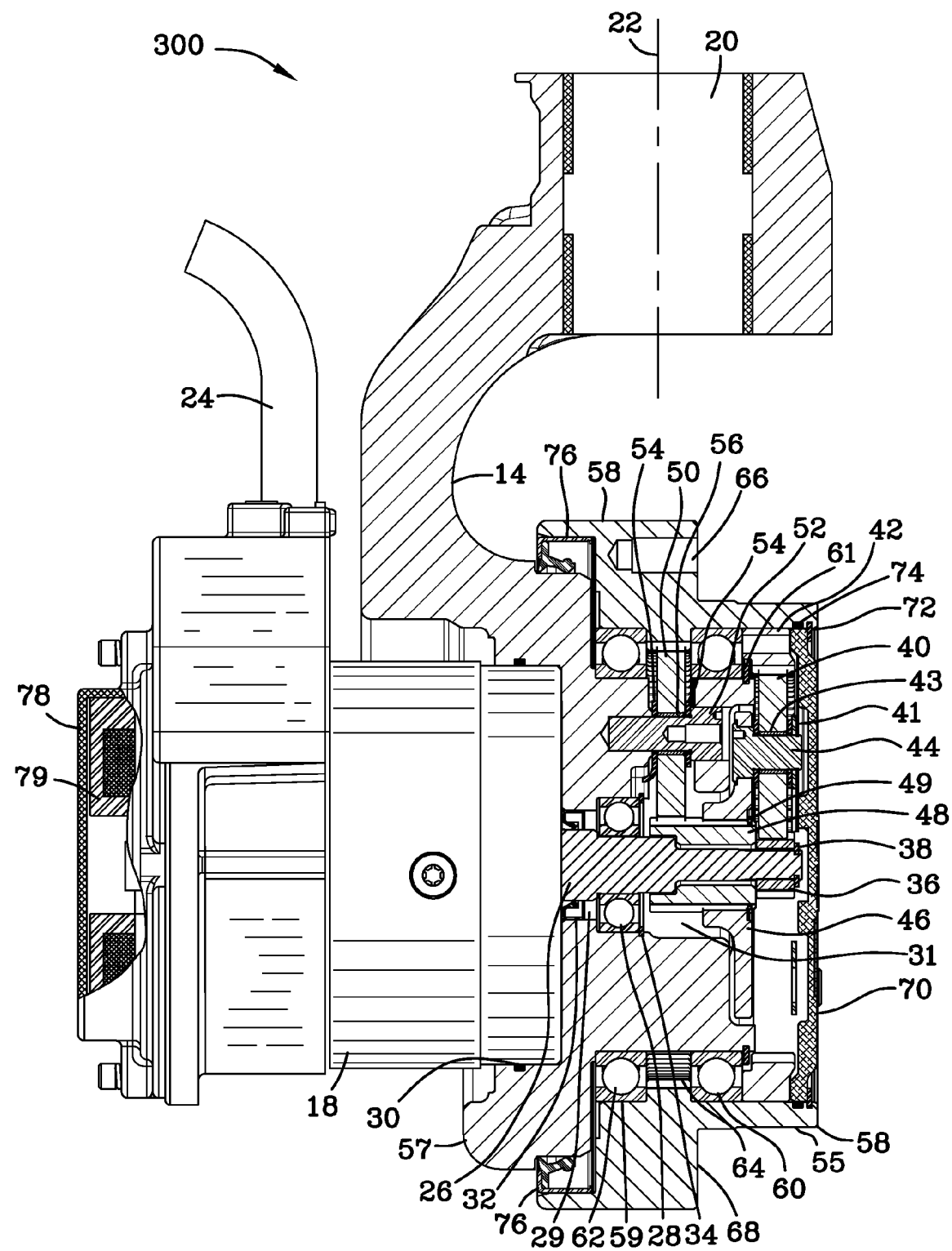
FIG. 3 is a side, partially cross-sectional view taken along line 3-3 of FIG. 2 in accordance with the prior art.
Figure 3A:
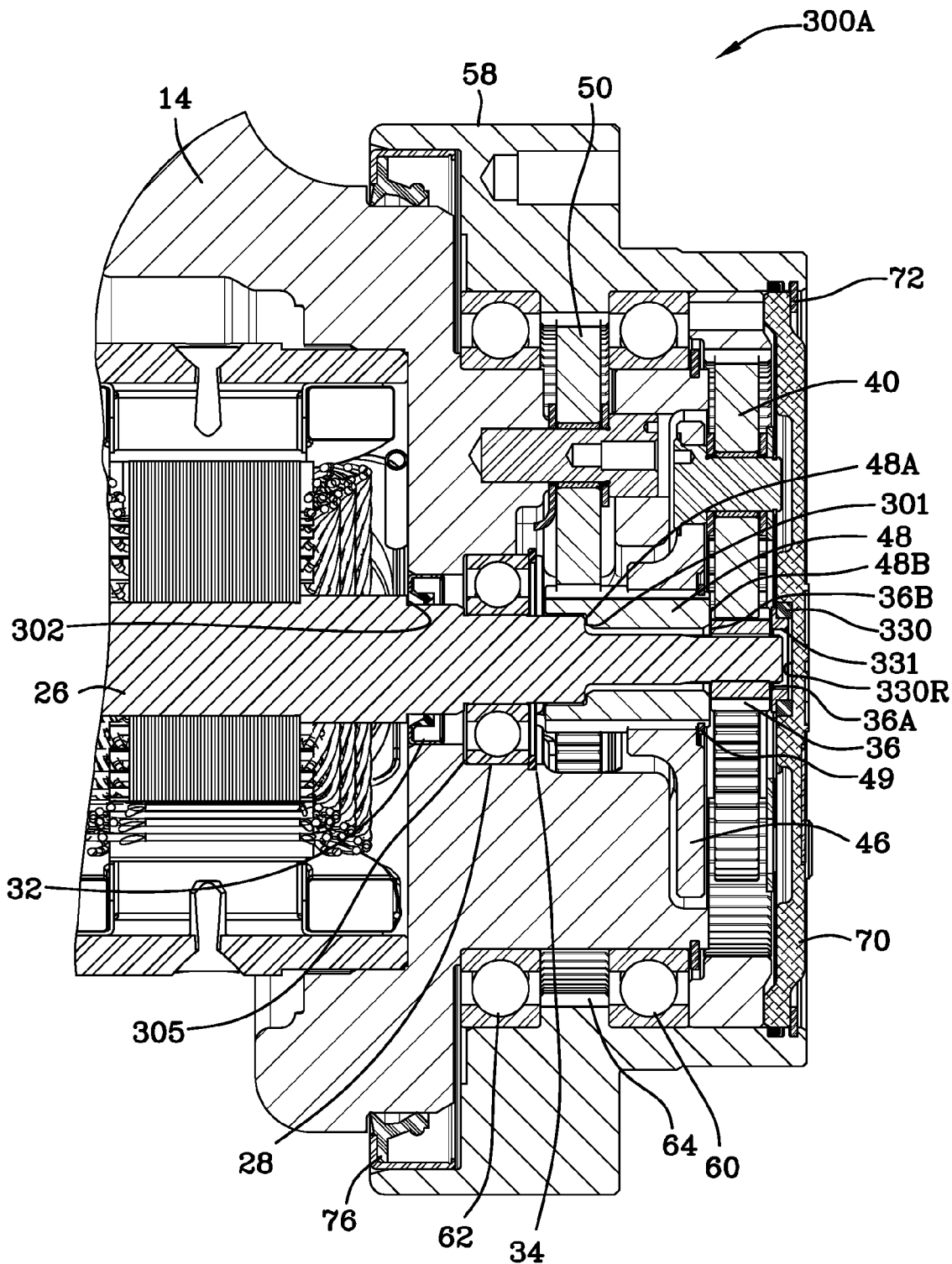
FIG. 3A is a side partially cross-sectional view of another embodiment of the prior art.

Referring to FIG. 3A, use of the thrust washer eliminates the need to control the distance between a first shoulder 301 and a second shoulder 302 of the output shaft 26. Still referring to FIG. 3A, shoulder 301 on output shaft 26 must reside at the precise location distally with respect to the motor or another location on the output shaft. Put another way, shoulder 301 on shaft 26 must be located precisely with respect to spindle 14. The location of shoulder 301 is important as a corresponding shoulder 48A of output sun gear 48 engages shoulder 301 of output shaft 26 and rotates with respect to output shaft 26. The precise location of shoulder 301 on shaft 26 determines whether the generally cylindrically shaped output sun gear 48 fits correctly in the allotted space. If the shoulder 301 is located at the proper axial location the output sun gear 48 will fit properly. If the axial location of shoulder 301 is located too far from shoulder 302, then the output sun gear will fit too tightly between shoulder 301 and the proximate end 36B of input sun gear 36. If the axial location of shoulder 301 is not located far enough from shoulder 302, then output sun gear 48 will fit too loosely between shoulder 301 and the proximate end 36B of input sun gear 36.

Use of the thrust washer 406 positioned between spindle 14 and output sun 48 provides a reference (the spindle) which is accurate and reliable. Output sun gear 48 reliably fits within the allocated axial space between washer 406 and proximate end 36B of input sun gear 36. Tolerances of output sun gear 48, washer 406, input sun gear 36 and bracket 331 ensure proper fitting of output sun gear 48 between washer 406 and sun gear 36. Use of the washer 406 greatly improves operation of the gear system by reducing the end play of the output sun gear 48.

The input sun gear 36 rotationally drives the input planetary gears 40 which are in engagement with and react against the first ring gear 42 producing rotation of the input gear carrier 46. The splined interior 46A of the input gear carrier 46 interengages the splined exterior 48S of the output sun gear 48. The planetary gear system further includes output planetary gears 50 driven by the splined exterior 48S of the output sun gear 48S.

The output planetary gears are mounted for rotation with respect to the spindle bracket such that rotation of the output sun gear causes the output planetary gears to rotate. Reference numeral 407 indicates a seal residing between the output shaft 26 and spindle 14 adjacent washer 406.

An output ring gear 64 joined to the interior of the wheel hub is positioned between the third set of bearings 62 and the fourth set of bearings 60 and is joined to the interior surface 59 of the wheel hub. The output ring gear 64 engages the output planetary gears 50 of the multistage planetary gear system so that rotation of the output planetary gears 50 causes output ring gear 64 and the wheel hub 58 to rotate such that mechanical force through the planetary gear system is applied to the wheel hub.

Figure 4C:
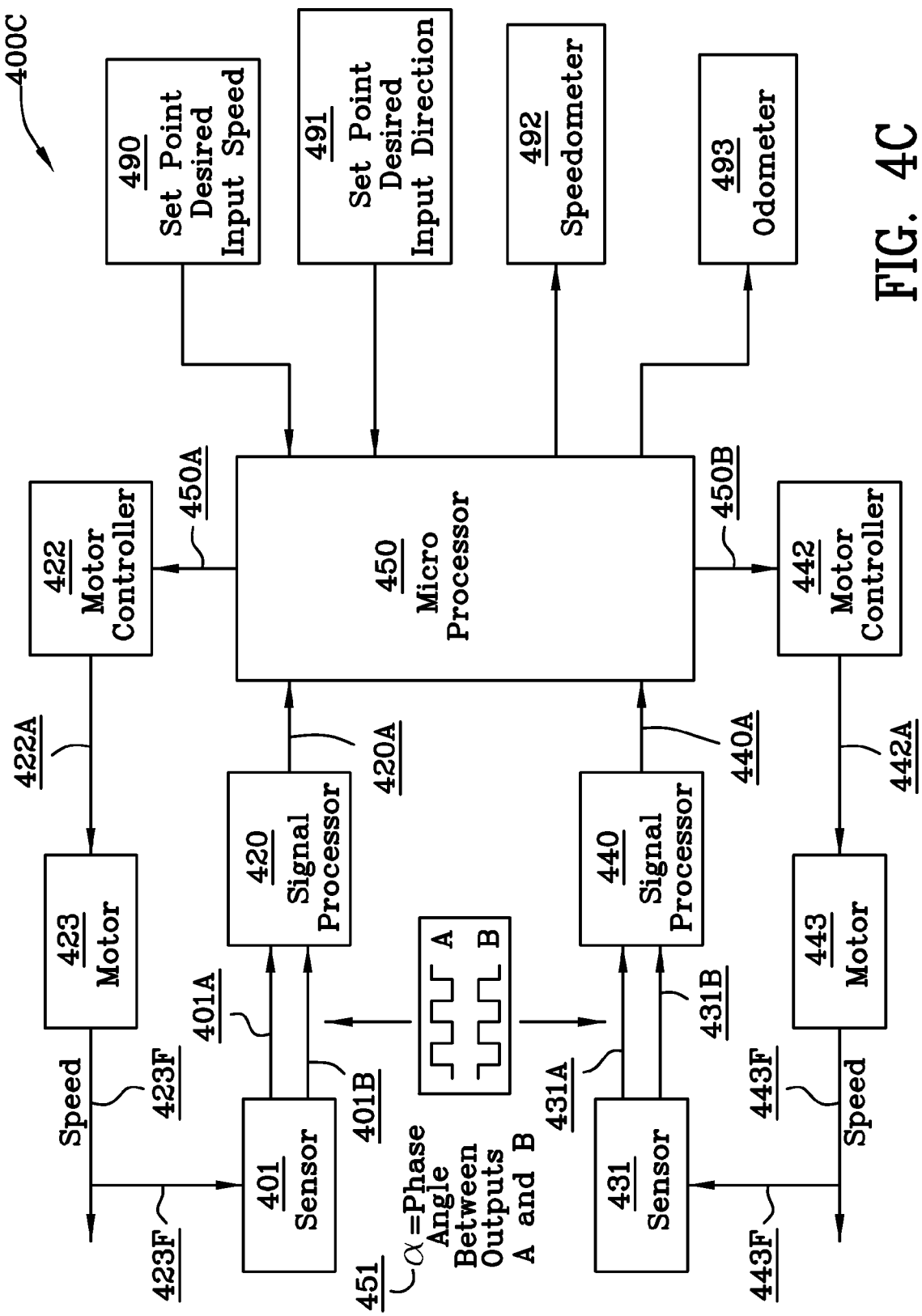
FIG. 4C is a schematic of the microprocessor, speed and direction control sensors, the signal processors, the motor controllers the motors and the respective outputs for both of the wheels.

FIG. 4C is a schematic 400C of the microprocessor 450, speed and direction control sensors 401, 431, the signal processors 420, 440, the motor controllers 422, 442, the motors 423, 443 and the respective outputs for both wheels. FIG. 4C illustrates the operation of a 2 wheel drive system. Four wheel drive systems are specifically contemplated. The speed and direction sensors 401, 431 output two square wave signals 401A, 431A, 401B, 431B which are out of phase as designated by phase angle, α, (REFERENCE NUMERAL 499) with respect to each other. The direction of shaft 26 is determined by the relationship between the output signals 401A, 401B of the bearing unit sensor. A signal processor 420, 440 adapts the square wave signals for input into the microprocessor 450. The microprocessor 450 receives the adapted square wave signals. An operator input station applies the desired wheel hub speed 490 and direction 491 to the microprocessor 450. The microprocessor 450 receives the adapted square wave signals 420A, 440A and compares the square wave signals to the desired wheel hub speed 490 and direction 491 input signals and outputs a corrective control signal 450A, 450B according to an algorithm. Any number of algorithms may be used and the algorithms may be used to protect the motor and to protect the operator of the equipment. The microprocessor 450, sometimes referred to herein as an embedded microcontroller or embedded microprocessor, protects the motors.

A motor controller 422, 442 receives and processes the corrective control signal 450A, 450B from the microprocessor 450 and outputs a control signal 422A, 442A to the electric motor 423, 442 dictating the speed and direction of the output shaft. Sensors 401, 431 detect the speed and direction 423F, 443F of the motor 423, 443.

Figure 1:
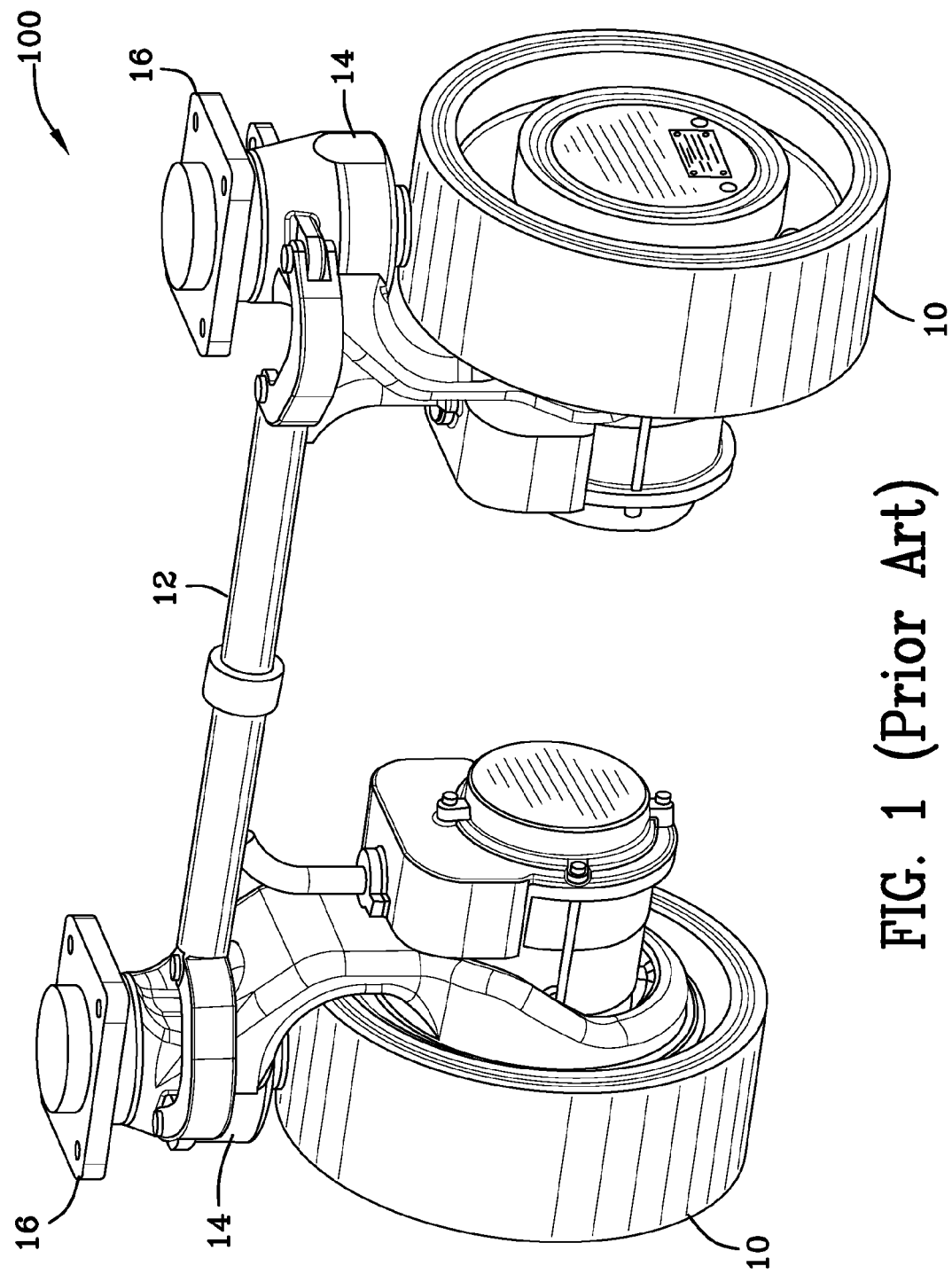
FIG. 1 is a perspective view of a pair of wheel motors in accordance with the prior art interconnected by a tie bar used for steering.
Figure 2:
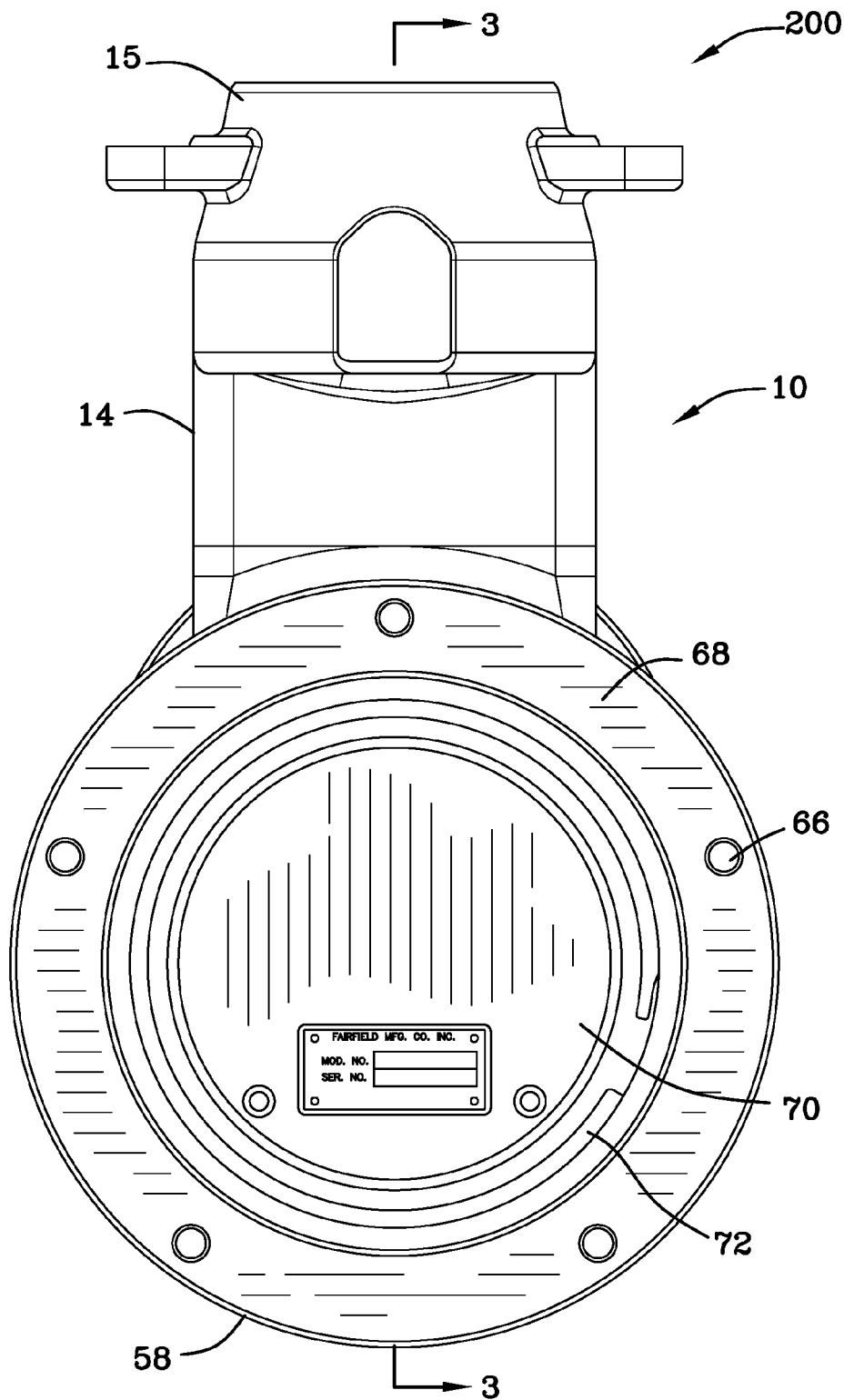
FIG. 2 is a front view of a wheel motor in accordance with the prior art.

Reference Numerals
10—two wheel motor assemblies
12—interconnecting tie bar assembly
14—spindle brackets
15—upper end of spindle bracket 14
16—bracket
18—motor
22—vertical axis
24—cable
26—output shaft
28—shaft bearing
29—circular opening
30—O-ring seal
31—gear compartment
32—lip seal
34—retaining ring
36—input sun gear
36A—distal end of input sun gear 36
36B—proximate end of input sun gear 36
38—retaining ring
40—input planet gear
41—lock ring
42—ring gear
43—needle bearings
44—input planet pins
46—input carrier
46S—splined interior of input carrier 46
48—output sun gear
48A—proximate shoulder on output sun gear 48
48B—distal end of output sun gear abutting 36B, the proximate end of input sun gear
48C—proximate end of output sun gear 48
48S—splined exterior of output sun 48
49—locking ring
50—output planet gears
52—pins
54—thrust washers
55—exterior surface of hub 50
56—needle bearings
57—lower end of spindle bracket 14
58—generally cylindrically shaped hub
59—interior surface of hub 50
60—bearings
62—bearings
64—output ring gear
70—cover
72—locking ring
74—O-ring seal
76—lip seal
78—cover
79—braking mechanism
100—perspective view of a pair of wheel motors in accordance with the prior art interconnected by a tie bar used for steering
200—a front view of a wheel motor in accordance with the prior art.
300—a side, partially cross-sectional view taken along line 3-3 of FIG. 2 in accordance with the prior art
300A—side partially cross-sectional view of another embodiment of the prior art
301—shoulder on shaft 26 which abuts shoulder 48A on output sun gear
302—shoulder on drive shaft 26 within the electric motor
305—shoulder on spindle 14 for engagement of bearing 28
330—circumferential spacer
330R—centrally located recess
331—circumferential bracket
400—cross-sectional view of the invention illustrating the speed sensor bearing unit, the thrust washer, the output sun gear abutting the thrust washer and the drive shaft.
400A—enlargement of a portion of FIG. 4
400B—perspective view of the speed sensor bearing unit mounted on the drive shaft
400C—schematic of the microprocessor, speed and direction control sensors, the signal processors the signal controllers the motor controllers the motors and the respective outputs for both of the wheels
401, 431—bearing/speed sensor
401A, 431A—signal A
401B, 432A—signal B
499—α, phase between signal 401A and 401B, determines direction of shaft
402—cable leading from the speed sensor 403—inner, rotating, race of the bearing/speed sensor affixed to shaft 26
404—ball bearings
405—outer, stationary, race of the bearing/speed sensor engaging spindle 24
406—thrust washer
407—seal
408—external portion of cable 402
409—bearing/speed sensor seal
412—spline on output shaft 26
413—magnetized impulse ring
414—sensor body
420, 440—signal processor
420A, 440A—processed signal
422, 442—motor controller
422A, 442A—motor controller output
423, 443—motor
423F, 443F—actual motor speed
450—microprocessor
450A, 450B—microprocessor output
461—first set of standard bearings
465—interior edge of hub 58
466—exterior edge of hub 58
490—setpoint, desired input speed
491—setpoint, desired input direction
492—speedometer
493—odometer The invention has been described by way of example with particularity herein. Those skilled in the art will realize that changes may be made to the invention without departing from the spirit and scope of the claims which follow hereinbelow.

The invention claimed is:

1. A steerable wheel motor assembly for moving construction lifts and scaffold equipment, comprising:
   a spindle bracket configured to be pivotably mounted at an upper end to the equipment for rotation about a vertical axis, said spindle bracket includes a lower end portion, said lower end portion includes an interior portion and a shaft opening in said interior portion;
   an electric motor mounted to said lower end portion of said spindle bracket, said motor having an output shaft that rotates about an output shaft axis of rotation when electrical power is supplied to said motor, said output shaft of said motor positioned through said shaft opening in said interior portion of said lower end portion of said spindle bracket;
   said output shaft being supported by a first set of bearings and a second set of bearings, said first set of bearings residing within said electric motor and said second set of bearings residing between said spindle bracket and said output shaft;
   said second set of bearings includes a speed and direction sensor integral therewith for detecting the speed and direction of rotation of said output shaft;
   said second set of bearings includes an inner race and an outer race;
   said inner race being affixed to said output shaft and rotatable therewith and said outer race being stationary;
   a magnetized impulse ring affixed to said inner race and rotatable therewith;
   a sensor body affixed to said outer race which detects the magnetic impulses provided when said inner impulse ring and said shaft are rotating;
   a substantially cylindrical wheel hub mounted to said spindle bracket for rotation about said output shaft axis of rotation;
   said wheel hub includes an exterior surface to which a wheel can be mounted, an interior surface surrounding said interior portion of said lower end of said spindle bracket, an interior edge between said exterior and interior surfaces, and, an exterior edge between said exterior and interior surfaces;
   said hub supported for rotation by a third set of bearings positioned adjacent said interior edge of said hub, and a fourth set of bearings positioned inwardly from said exterior edge of said hub;
   a multi-stage planetary gear system mounted around said output shaft of said motor and positioned within said interior portion of said spindle bracket and within said cylindrical wheel hub between said exterior edge and said interior edge;
   said planetary gear system includes an input sun gear positioned between said fourth set of bearings and said exterior edge of said hub and mounted on said output shaft of said motor;
   said input sun gear includes a proximate portion and a distal portion;
   said planetary gear system further includes input planetary gears, a first ring gear affixed to said interior portion of said wheel hub, an input gear carrier including a splined interior, and, an output sun gear including a splined exterior;
   said output sun gear includes a proximate portion and a distal portion;
   a thrust washer resides between said spindle bracket and said proximate end of said output sun gear;
   said proximate portion of said output sun gear interengages said thrust washer and said distal portion of said output sun gear interengages said proximate portion of said input sun gear;
   an end cover affixed to said wheel hub;
   said end cover of said wheel hub includes a centrally located cylindrical recess therein;
   a circumferential spacer ring and a circumferential bracket reside in said cylindrical recess in said cover;
   said distal portion of said input sun gear interengages said circumferential bracket in said cylindrical recess in said cover;
   said input sun gear rotationally drives said input planetary gears which are in engagement with and react against said first ring gear producing rotation of said input gear carrier;
   said splined interior of said input gear carrier interengages said splined exterior of said output sun gear;
   said planetary gear system further includes output planetary gears driven by said splined exterior of said output sun gear;
   an output ring gear positioned between said third set of bearings and said fourth set of bearings and joined to said interior surface of said wheel hub; and,
   said output ring gear engaging said output planetary gears of said multistage planetary gear system so that rotation of said output planetary gears causes said output planetary gears and said wheel hub to rotate such that mechanical force through said planetary gear system is applied to said wheel hub.

2. A steerable wheel motor assembly for moving construction lifts and scaffold equipment as claimed in claim 1, further comprising:
   said speed and direction sensor outputs two square wave signals;
   a signal processor for adapting said square wave signals;

a microprocessor receives said adapted square wave signals;

an operator input station for inputting the desired wheel hub speed and direction to said microprocessor;

said microprocessor receives said adapted square wave signals and compares said square wave signals to said desired wheel hub speed and direction input signals and outputs a corrective control signal according to an algorithm; and, a motor controller for receiving and processing said corrective control signal from said microprocessor and outputting a motor control signal to said electric motor dictating the speed and direction of said output shaft and said equipment.

3. An assembly for moving construction lifts and scaffold equipment, comprising:

first and second steerable wheel motor assemblies for moving construction lifts and scaffold equipment;

each of said first and second steerable wheel motor assemblies for moving construction lifts and scaffold equipment includes:

a spindle bracket configured to be pivotably mounted at an upper end to a steering mechanism for rotation about a vertical axis;

an electric motor mounted to a lower end of said spindle bracket, said motor having an output shaft that rotates about an output shaft axis of rotation when electrical power is supplied to said motor, said output shaft positioned through a shaft opening into a hollow interior portion of said lower end portion of said spindle bracket;

said output shaft being supported by a first set of bearings and a second set of bearings, said first set of bearings residing within said electric motor and said second set of bearings residing between said spindle bracket and said output shaft;

said second set of bearings includes a speed and direction sensor integral therewith for detecting the speed and direction of rotation of said output shaft;

said second set of bearings includes an inner race and an outer race;

said inner race being affixed to said output shaft and rotatable therewith and said outer race being stationary;

a magnetized impulse ring affixed to said inner race and rotatable therewith;

a sensor body affixed to said outer race which detects the magnetic impulses provided when said inner impulse ring and said shaft are rotating;

a substantially cylindrical wheel hub mounted to said spindle bracket for rotation about said output shaft axis of rotation;

said wheel hub includes an exterior surface to which a wheel can be mounted, an interior surface surrounding said interior portion of said lower end of said spindle bracket, an interior edge between said exterior and interior surfaces, and, an exterior edge between said exterior and interior surfaces;

said hub supported for rotation by a third set of bearings positioned adjacent said interior edge of said hub, and a fourth set of bearings positioned inwardly from said exterior edge of said hub;

a multi-stage planetary gear system mounted around said output shaft of said motor and positioned within said interior portion of said spindle bracket and within said cylindrical wheel hub between said exterior edge and said interior edge;

said planetary gear system includes an input sun gear positioned between said fourth set of bearings and said exterior edge of said hub and mounted on said output shaft of said motor;

said input sun gear includes a proximate portion and a distal portion;

said planetary gear system further includes input planetary gears, a first ring gear affixed to said interior portion of said wheel hub, an input gear carrier including a splined interior, and, an output sun gear including a splined exterior;

said output sun gear includes a proximate portion and a distal portion;

a thrust washer resides between said spindle bracket and said proximate end of said output sun gear;

said proximate portion of said output sun gear interengages said thrust washer and said distal portion of said output sun gear interengages said proximate portion of said input sun gear;

an end cover affixed to said wheel hub;

said end cover of said wheel hub includes a centrally located cylindrical recess therein;

a circumferential spacer ring and a circumferential bracket reside in said cylindrical recess in said cover;

said distal portion of said input sun gear interengages said circumferential bracket in said cylindrical recess in said cover;

said input sun gear rotationally drives said input planetary gears which are in engagement with and react against said first ring gear producing rotation of said input gear carrier;

said splined interior of said input gear carrier interengages said splined exterior of said output sun gear;

said planetary gear system further includes output planetary gears driven by said splined exterior of said output sun gear;

an output ring gear positioned between said third set of bearings and said fourth set of bearings and joined to said interior surface of said wheel hub; and, said output ring gear engaging said output planetary gears of said multistage planetary gear system so that rotation of said output planetary gears causes said output planetary gears and said wheel hub to rotate such that mechanical force through said planetary gear system is applied to said wheel hub.

4. A steerable wheel motor assembly for moving construction lifts and scaffold equipment as claimed in claim 3, further comprising:

said speed and direction sensor outputs two square wave signals;

a signal processor for adapting said square wave signals;

a microprocessor receives said adapted square wave signals;

an operator input station for inputting the desired wheel hub speed and direction to said microprocessor;

said microprocessor receives said adapted square wave signals and compares said square wave signals to said desired wheel hub speed and direction input signals and outputs a corrective control signal according to an algorithm; and, a motor controller for receiving and processing said corrective control signal from said microprocessor and outputting a motor control signal to said electric motor dictating said speed and direction of said output shaft.

5. An assembly for moving construction lifts and scaffold equipment, comprising:

first and second steerable wheel motor assemblies for moving construction lifts and scaffold equipment;

each of said first and second steerable wheel motor assemblies for moving construction lifts and scaffold equipment includes:

a spindle bracket configured to be pivotably mounted at an upper end to the equipment for rotation about a vertical axis, said spindle bracket includes a lower end portion, said lower end portion includes an interior portion and a shaft opening in said interior portion;

an electric motor mounted to said lower end portion of said spindle bracket, said motor having an output shaft that rotates about an output shaft axis of rotation when electrical power is supplied to said motor, said output shaft of said motor positioned through said shaft opening in said interior portion of said lower end portion of said spindle bracket;

a substantially cylindrical wheel hub mounted to said spindle bracket for rotation about said output shaft axis of rotation said wheel hub includes an exterior surface to which a wheel can be mounted, an interior surface surrounding said interior portion of said lower end of said spindle bracket, an interior edge between said exterior and interior surfaces, and, an exterior edge between said exterior and interior surfaces;

said hub supported for rotation by a third set of bearings positioned adjacent said interior edge of said hub, and a fourth set of bearings positioned inwardly from said exterior edge of said hub;

said output shaft being supported by a first set of bearings and a second set of bearings, said first set of bearings residing within said electric motor and said second set of bearings residing between said spindle bracket and said output shaft;

said second set of bearings includes a speed and direction sensor integral therewith for detecting the speed and direction of rotation of said output shaft;

said second set of bearings includes an inner race and an outer race;

said inner race being affixed to said output shaft and rotatable therewith and said outer race being stationary and in engagement with said spindle;

a magnetized impulse ring affixed to said inner race of said second set of bearings and rotatable therewith;

a sensor body affixed to said outer race which detects magnetic impulses provided when said inner impulse ring and said shaft are rotating;

a first sun gear affixed to said shaft so that rotation of said shaft rotates said first sun gear;

said first sun gear positioned between said fourth set of bearings and said exterior edge of said hub and mounted on said output shaft of said motor;

said first sun gear includes a proximate portion and a distal portion;

first planetary gears;

a first ring gear affixed to said interior portion of said wheel hub;

a first carrier, said first carrier includes a splined interior;

an output sun gear, said output sun gear includes a splined exterior;

said output sun gear includes a proximate portion and a distal portion, said output sun gear mounted for rotation about said axis of said output shaft;

a thrust washer resides between said spindle bracket and said proximate end of said output sun gear;

said proximate portion of said output sun gear interengages said thrust washer and said distal portion of said output sun gear interengages said proximate portion of said first sun gear;

an end cover affixed to said wheel hub;

said cover of said wheel hub includes a centrally located cylindrical recess therein, a circumferential spacer ring and a circumferential bracket reside in said cylindrical recess in said cover;

said distal portion of said input sun gear interengages said circumferential bracket in said cylindrical recess in said cover;

said interengagement of said proximate portion of said output sun gear with said thrust washer, said interengagement of said distal portion of said output sun gear with said proximate portion of said first sun gear, and said interengagement of said distal portion of said input sun gear with said circumferential bracket in said cylindrical recess in said cover controls the position of said output sun gear axially;

said first sun gear rotationally drives said first planetary gears which are in engagement with and react against said first ring gear producing rotation of said first carrier;

said splined interior of said first carrier interengages said splined exterior of said output sun gear causing rotation of said output sun gear;

output planetary gears engaging said splined exterior of said output sun gear, said output planetary gears mounted for rotation with respect to said spindle bracket, such that rotation of said output sun gear causes said output planetary gears to rotate;

an output ring gear joined to the interior of said wheel hub positioned between said third set of bearings and said fourth set of bearings; and, said output ring gear engaging said output planetary gears so that rotation of said output planetary gears causes said output ring gear and wheel hub to rotate.

6. An assembly for moving construction lifts and scaffold equipment, as claimed in claim 5, further comprising:

said speed and direction sensor outputs two square wave signals;

a signal processor for adapting said square wave signals;

a microprocessor receives said adapted square wave signals;

an operator input station for inputting the desired wheel hub speed and direction to said microprocessor;

said microprocessor receives said adapted square wave signals and compares said square wave signals to said desired wheel hub speed and direction input signals and outputs a corrective control signal according to an algorithm; and, a motor controller for receiving and processing said corrective control signal from said microprocessor and outputting a motor control signal to said electric motor dictating the speed and direction of said output shaft.

* * * * *